(12) United States Patent
Takeshita et al.

(10) Patent No.: US 11,787,499 B2
(45) Date of Patent: Oct. 17, 2023

(54) BICYCLE COMMUNICATION APPARATUS

(71) Applicant: Shimano Inc., Osaka (JP)

(72) Inventors: Hiroaki Takeshita, Osaka (JP); Shun Kakehashi, Osaka (JP); Taketoshi Sato, Osaka (JP)

(73) Assignee: Shimano Inc., Osaka (JP)

( * ) Notice: Subject to any disclaimer, the term of this patent is extended or adjusted under 35 U.S.C. 154(b) by 572 days.

(21) Appl. No.: 16/141,053

(22) Filed: Sep. 25, 2018

(65) Prior Publication Data

US 2019/0106178 A1    Apr. 11, 2019

(30) Foreign Application Priority Data

Oct. 6, 2017    (JP) ................. 2017-196190

(51) Int. Cl.
| | | |
|---|---|---|
| *B62M 6/45* | (2010.01) | |
| *B62M 25/08* | (2006.01) | |
| *B62J 50/22* | (2020.01) | |
| *B62M 6/55* | (2010.01) | |
| *B62J 45/00* | (2020.01) | |
| *B62J 45/20* | (2020.01) | |
| *B62M 6/15* | (2010.01) | |
| *B62K 23/02* | (2006.01) | |
| *B62J 43/13* | (2020.01) | |
| *B62J 43/20* | (2020.01) | |
| *B62M 9/06* | (2006.01) | |

(52) U.S. Cl.
CPC ............... *B62M 6/15* (2013.01); *B62J 43/13* (2020.02); *B62J 43/20* (2020.02); *B62J 50/22* (2020.02); *B62K 23/02* (2013.01); *B62M 6/55* (2013.01); *B62M 9/06* (2013.01); *B62M 25/08* (2013.01); *B62J 45/00* (2020.02); *B62J 45/20* (2020.02)

(58) Field of Classification Search
CPC .......... B62M 6/45; B62M 6/55; B62M 25/08; B62M 2025/003; B62M 9/127; B62M 9/06; B62J 50/20; B62J 50/21; B62J 50/22; B62J 50/225; B62J 45/00; B62J 45/20; B62J 11/10; B62J 11/19
USPC ..................... 180/206.2; 340/12.5
See application file for complete search history.

(56) References Cited

U.S. PATENT DOCUMENTS

| 8,616,321 | B2 * | 12/2013 | Aoki ........................ B60L 7/12 |
| | | | 180/206.1 |
| 9,701,190 | B2 | 7/2017 | Biderman et al. |
| 2011/0267178 | A1 | 11/2011 | Nishihara et al. |
| 2012/0221203 | A1 | 8/2012 | Ichida et al. |

(Continued)

FOREIGN PATENT DOCUMENTS

| CN | 1410317 A | 4/2003 |
| CN | 105936324 A | 9/2016 |

(Continued)

*Primary Examiner* — Anne Marie M Boehler
(74) *Attorney, Agent, or Firm* — Global IP Counselors, LLP (57) ABSTRACT

A bicycle communication apparatus is provided that contributes to usability. The bicycle communication apparatus includes a base portion and a wireless communicator provided at the base portion. The wireless communicator is configured to transmit first information related to a motor that assists propulsion of a bicycle and second information related to a shifting device of the bicycle through wireless communication.

20 Claims, 7 Drawing Sheets

(56) References Cited

U.S. PATENT DOCUMENTS

| | | | |
|---|---|---|---|
| 2013/0061705 A1* | 3/2013 | Jordan | B62K 23/06 74/473.13 |
| 2014/0290411 A1* | 10/2014 | Kuroda | B62M 9/122 74/473.12 |
| 2015/0076790 A1* | 3/2015 | Sugimoto | F16L 3/06 280/283 |
| 2015/0180517 A1* | 6/2015 | Abe | G08C 17/00 455/99 |
| 2015/0345620 A1* | 12/2015 | Watarai | B62M 11/16 701/52 |
| 2016/0016627 A1* | 1/2016 | Thompson | B62K 11/14 180/206.2 |
| 2016/0052594 A1* | 2/2016 | Kimmich | B62M 9/122 701/22 |
| 2016/0082772 A1* | 3/2016 | Biderman | B60Q 9/00 301/6.5 |
| 2016/0129969 A1 | 5/2016 | Chen | |
| 2016/0257269 A1 | 9/2016 | Watarai et al. | |
| 2016/0257377 A1* | 9/2016 | Hashimoto | B62M 25/08 |
| 2017/0029057 A1 | 2/2017 | Kato et al. | |
| 2018/0056812 A1* | 3/2018 | Hamann | B62M 6/40 |
| 2018/0197401 A1* | 7/2018 | Khaligh | B62M 6/55 |
| 2018/0257740 A1* | 9/2018 | Kikkawa | B62B 5/0073 |

FOREIGN PATENT DOCUMENTS

| | | | | |
|---|---|---|---|---|
| DE | 10 2016 001 909 A1 | | 9/2016 | |
| EP | 0431243 A1 | * | 6/1991 | B62J 50/22 |
| JP | 2011-230714 A | | 11/2011 | |
| JP | 2012-179974 A | | 9/2012 | |
| JP | 5305513 B2 | | 7/2013 | |
| JP | 2014-144767 A | | 8/2014 | |
| JP | 2015-131533 A | | 7/2015 | |
| JP | 2016-265991 A | | 9/2016 | |
| JP | 2017-30395 A | | 2/2017 | |
| WO | 2015/154046 A1 | | 10/2015 | |

* cited by examiner

BICYCLE COMMUNICATION APPARATUS

CROSS-REFERENCE TO RELATED APPLICATIONS

This application claims priority to Japanese Patent Application No. 2017-196190, filed on Oct. 6, 2017. The entire disclosure of Japanese Patent Application No. 2017-196190 is hereby incorporated herein by reference.

BACKGROUND

Field of the Invention

The present invention generally relates to a bicycle communication apparatus.

Background Information

Japanese Laid-Open Patent Publication No. 2015-131533 (Patent document 1) discloses an information collection system that transmits shifting position information related to a shifting device of a bicycle to an information processing device through wireless communication.

SUMMARY

In the above information collection system, information related to a component configured to control a drive state of the bicycle other than the shifting device is not disclosed.

One object of the present disclosure is to provide a bicycle communication apparatus that contributes to usability.

A first aspect of a bicycle communication apparatus according to the present disclosure includes a base portion and a wireless communicator provided at the base portion. The wireless communicator is configured to transmit first information related to a motor that assists in propulsion of a bicycle and second information related to a shifting device of the bicycle through wireless communication. According to the first aspect, the first information related to the motor and the second information related to the shifting device are transmitted by the single wireless communication unit through wireless communication. This contributes to usability.

In accordance with a second aspect of the present disclosure, the bicycle communication apparatus according to the first aspect is configured so that the first information of the wireless communicator includes information for indicating a control state of the motor on an external device. According to the second aspect, the user can acknowledge the first information via the external device.

In accordance with a third aspect of the present disclosure, the bicycle communication apparatus according to the first or second aspect is configured so that the second information of the wireless communicator includes information for indicating a control state of the shifting device on an external device. According to the third aspect, the user can acknowledge the second information via the external device.

In accordance with a fourth aspect of the present disclosure, the bicycle communication apparatus according to any one of the first to third aspects is configured so that the base portion has an accommodation, and the wireless communicator is provided in the accommodation space. According to the fourth aspect, collection of an object on the wireless communicator is limited.

In accordance with a fifth aspect of the present disclosure, the bicycle communication apparatus according to any one of the first to fourth aspects is configured so that the wireless communicator is configured to receive the first information and the second information from a bicycle component, and is configured to transmit the first information that was received and the second information that was received. According to the fifth aspect, the first information and the second information, which are held by the bicycle component, are transmitted from the bicycle communication apparatus.

In accordance with a sixth aspect of the present disclosure, the bicycle communication apparatus according to the fifth aspect is configured so that the base portion is provided independently from the bicycle component. According to the sixth aspect, the bicycle communication apparatus can be arranged at a position desired by the user.

In accordance with a seventh aspect of the present disclosure, the bicycle communication apparatus according to the fifth aspect is configured so that the base portion is provided at the bicycle component. According to the seventh aspect, the bicycle communication apparatus and the bicycle component are gathered together.

In accordance with an eighth aspect of the present disclosure, the bicycle communication apparatus according to any one of the fifth to seventh aspects is configured so that the wireless communicator is configured to receive the first information from a first controller of the bicycle component in which the first controller controls the motor. According to the eighth aspect, the first information, which is held by the first controller controlling the motor, is transmitted from the bicycle communication apparatus.

In accordance with a ninth aspect of the present disclosure, the bicycle communication apparatus according to any one of the fifth to eighth aspects is configured so that the wireless communicator is configured to receive the second information from a second controller of the bicycle component in which the second controller controls the shifting device. According to the ninth aspect, the second information, which is held by the second controller controlling the shifting device, is transmitted from the bicycle communication apparatus.

In accordance with a tenth aspect of the present disclosure, the bicycle communication apparatus according to any one of the fifth to seventh aspects is configured so that the wireless communicator is configured to receive the first information and the second information from a third controller of the bicycle component in which the third controller controls the motor and the shifting device. According to the tenth aspect, the first information and the second information, which are held by the third controller controlling the motor and the shifting device, are transmitted from the bicycle communication apparatus.

In accordance with an eleventh aspect of the present disclosure, the bicycle communication apparatus according to any one of the fifth to tenth aspects is configured so that the bicycle component includes a first bicycle component including the motor and a second bicycle component including the shifting device. According to the eleventh aspect, the first information is received from the first bicycle component including the motor, and the second information is received from the second bicycle component including the shifting device.

In accordance with a twelfth aspect of the present disclosure, the bicycle communication apparatus according to any one of the fifth to seventh aspects is configured so that the bicycle component includes an operating device that operates either the motor or the shifting device, or both the motor and the shifting device, and the wireless communicator is configured to receive the first information or the second information from the operating device, or both the first information and the second information from the operating device. According to the twelfth aspect, the first information and the second information are received from the operating device.

In accordance with a thirteenth aspect of the present disclosure, the bicycle communication apparatus according to any one of the fifth to twelfth aspects further includes a wired communicator configured to communicate with the bicycle component via a wire. According to the thirteenth aspect, the first information and the second information are received from the bicycle component by the wired communicator.

In accordance with a fourteenth aspect of the present disclosure, the bicycle communication apparatus according to the thirteenth aspect is configured so that the wired communicator includes a power line communication circuit. According to the fourteenth aspect, power line communication can be performed with the bicycle component.

In accordance with a fifteenth aspect of the present disclosure, the bicycle communication apparatus according to the thirteenth or fourteenth aspect further includes a first connector connectable to a first electrical cable that connects the bicycle component to the wired communicator. According to the fifteenth aspect, the bicycle component is easily connected by connecting the first electrical cable to the first connector.

In accordance with a sixteenth aspect of the present disclosure, the bicycle communication apparatus according to the fifteenth aspect further includes at least one second connector electrically connected to the first connector in parallel. According to the sixteenth aspect, two or more bicycle components can be connected by the second connectors.

In accordance with a seventeenth aspect of the present disclosure, the bicycle communication apparatus according to the sixteenth aspect further includes a cover detachably coupled to the at least one second connector and a coupling member provided at the cover and configured to be coupled to a linear member installed on the bicycle. According to the seventeenth aspect, in a case where the second connectors are not used, the cover limits collection of an object on the second connectors. Additionally, the bicycle communication apparatus can be coupled to the linear member.

In accordance with an eighteenth aspect of the present disclosure, the bicycle communication apparatus according to the seventeenth aspect is configured so that the cover includes a first part, and the coupling member includes a second part coupled to the first part. According to the eighteenth aspect, the coupling member is stably coupled to the cover.

In accordance with a nineteenth aspect of the present disclosure, the bicycle communication apparatus according to the seventeenth aspect is configured so that the cover is formed integrally with the coupling member. According to the nineteenth aspect, the number of components is reduced.

In accordance with a twentieth aspect of the present disclosure, the bicycle communication apparatus according to any one of the thirteenth to nineteenth aspects further includes an operating portion operatively coupled to the wired communicator. The wired communicator transmits a control signal to change a control state of the motor in response to the operating portion being operated According to the twentieth aspect, the control state of the motor can be changed by operating the operating portion.

In accordance with a twenty-first aspect of the present disclosure, the bicycle communication apparatus according to any one of the first to twentieth aspects further includes an indicator provided at the base portion and configured to indicate either the first information or the second information, or both of the first information and the second information. According to the twenty-first aspect, the user can acknowledge the at least one of the first information and the second information via the indicator.

In accordance with a twenty-second aspect of the present disclosure, the bicycle communication apparatus according to the twenty-first aspect is configured so that the indicator includes one or more light emitting elements. According to the twenty-second aspect, the indicator is easily configured by the light emitting elements.

The bicycle communication apparatus of the present disclosure contributes to usability.

BRIEF DESCRIPTION OF THE DRAWINGS

Referring now to the attached drawings which form a part of this original disclosure.

DETAILED DESCRIPTION OF EMBODIMENTS DISCLOSURE

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiments

Referring to FIGS. 1 to 7, a bicycle B is illustrated including a bicycle electrical system 10 that includes a bicycle communication apparatus 50 in accordance with one embodiment. The bicycle B can be a mountain bike, a road bike, or a city bike. Further, the bicycle B can be a tricycle, a cargo bike, or a recumbent bike.

Figure 1:
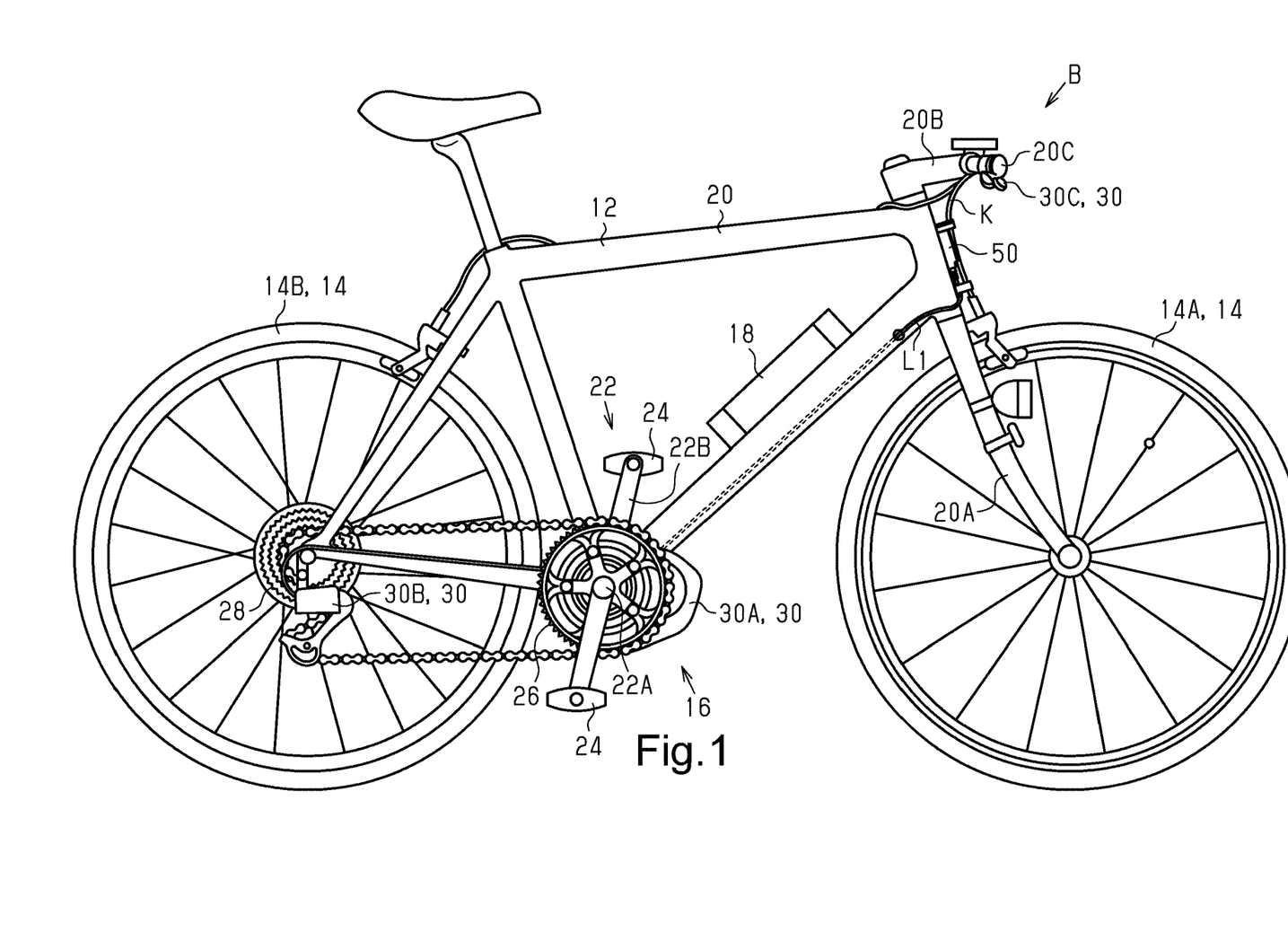
FIG. 1 is a side elevational view of a bicycle including one embodiment of a bicycle communication apparatus.

As shown in FIG. 1, the bicycle B includes a bicycle body 12, a pair of wheels 14, a drive mechanism 16, a battery 18, a plurality of bicycle components 30 and the bicycle communication apparatus 50. The bicycle body 12 includes a frame 20, a front fork 20A that is connected to the frame 20, and a handlebar 20C that is detachably connected to the front fork 20A via a stem 20B. The front fork 20A is supported by the frame 20.

The wheels 14 include a front wheel 14A and a rear wheel 14B. The axle of the front wheel 14A is connected to an end of the front fork 20A. The axle of the rear wheel 14B is connected to a rear end of the frame 20.

The drive mechanism 16 includes a crank 22 and a pair of pedals 24. The crank 22 includes a crankshaft 22A and a pair of crank arms 22B. The drive mechanism 16 transmits a human driving force (a manually inputted drive force) that is applied to the pedals 24 to the rear wheel 14B. The drive mechanism 16 includes a wheel member 26. The wheel member 26 is configured to be rotatable about a rotation axis that differs from rotation axes of the wheels 14. The wheel member 26 is coupled to the crankshaft 22A. The wheel member 26 includes a sprocket, a pulley or a bevel gear. The drive mechanism 16 is configured to transmit rotation of the crank 22 to a rear rotary body 28, which is coupled to the rear wheel 14B, via, for example, a chain, a belt or a shaft. The rear rotary body 28 includes a sprocket, a pulley or a bevel gear. A one-way clutch (not shown) is provided between the rear rotary body 28 and the rear wheel 14B. The one-way clutch is configured to allow the rear wheel 14B to rotate forward in a case where the rear rotary body 28 rotates forward. The wheel member 26 can include a plurality of front sprockets. The rear rotary body 28 can include a plurality of rear sprockets.

Figure 2:
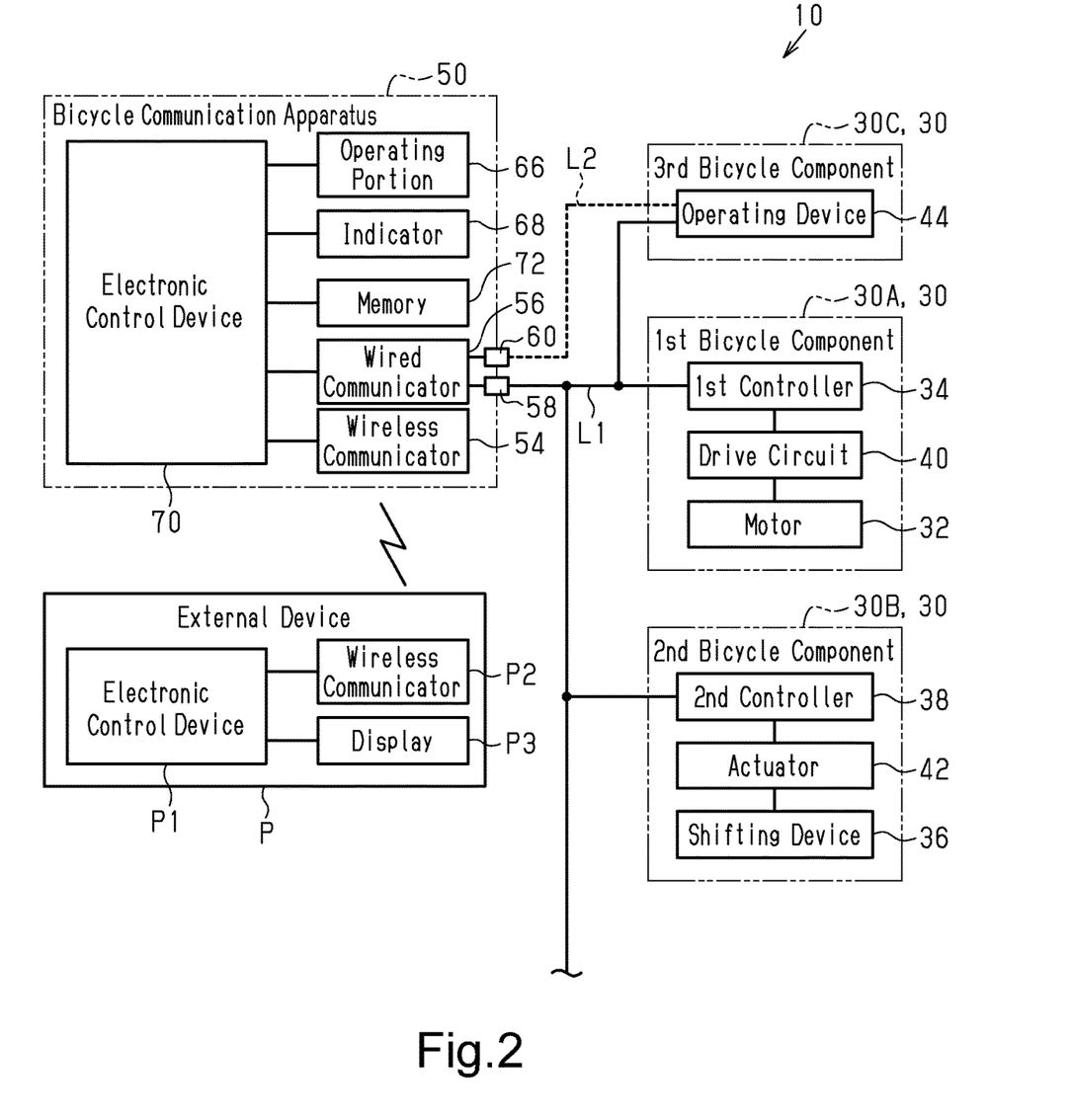
FIG. 2 is a block diagram showing a bicycle electrical system of the bicycle shown in FIG. 1 that include the bicycle communication apparatus.

As shown in FIG. 2, the bicycle components 30 include a first controller 34 that controls a motor 32. The first controller 34 includes an arithmetic processing unit that executes a predetermined control program. The arithmetic processing unit includes, for example, a central processing unit (CPU) or a micro processing unit (MPU). The first controller 34 can include one or more microcomputers that includes one or more processors and one or more computer storage devices (i.e., computer memory devices). The bicycle components 30 include a second controller 38 that controls a shifting device 36. The second controller 38 includes an arithmetic processing unit that executes a predetermined control program. The arithmetic processing unit includes, for example, a CPU or an MPU. The second controller 38 can include one or more microcomputers that includes one or more processors and one or more computer storage devices (i.e., computer memory devices). In an assist mode, the first controller 34 controls output of the motor 32 in accordance with an output of a sensor that detects a human driving force. The bicycle components 30 include a first bicycle component 30A and a second bicycle component 30B. The bicycle components 30 further include a third bicycle component 30C. The term "controller" as used herein refers to hardware that executes a software program.

The first bicycle component 30A includes the motor 32. The first bicycle component 30A further includes the first controller 34 and a drive circuit 40. The second bicycle component 30B includes the shifting device 36. The second bicycle component 30B further includes the second controller 38 and an actuator 42. The third bicycle component 30C includes an operating device 44 that operates either the motor 32 or the shifting device 36, or operates both the motor 32 and the shifting device 36. In other words, the operating device 44 can operate only the motor 32, only the shifting device 36, or both the motor 32 and the shifting device 36.

It is preferred that the motor 32, the first controller 34, and the drive circuit 40 of the first bicycle component 30A be provided in the same housing. The drive circuit 40 controls electric power supplied from the battery 18 to the motor 32. The drive circuit 40 is connected to the first controller 34 so that wired or wireless communication can be performed with each other. The drive circuit 40 is configured to communicate with the first controller 34 through, for example, serial communication. The drive circuit 40 drives the motor 32 in accordance with a control signal from the first controller 34. The motor 32 assists propulsion of the bicycle B. The motor 32 includes an electric motor. The motor 32 is provided to transmit rotation to the front wheel 14A or a transmission path of human driving force from the pedals 24 to the rear wheel 14B. The motor 32 is provided at the frame 20, the rear wheel 14B, or the front wheel 14A of the bicycle B. In one example, the motor 32 is coupled to a power transmission path extending from the crankshaft 22A to the wheel member 26. It is preferred that a one-way clutch (not shown) be provided in a power transmission path between the motor 32 and the crankshaft 22A so that in a case where the crankshaft 22A is rotated in a direction that moves the bicycle B forward, rotational force of the crank 22 will not cause the motor 32 to rotate. A component other than the motor 32 and the drive circuit 40 can be provided in the housing in which the motor 32 and the drive circuit 40 are provided. For example, a reduction unit that reduces the speed of rotation of the motor 32 and outputs the rotation can be provided. A one-way clutch configured to rotate the wheel member 26 forward in a case where the crankshaft 22A rotates forward can be provided in a driving force transmission path between the wheel member 26 and the crankshaft 22A.

It is preferred that the shifting device 36, the second controller 38, and the actuator 42 of the second bicycle component 30B be provided in the same housing. The shifting device 36 is configured to change the transmission ratio of the bicycle B. The shifting device 36 is configured to change the transmission ratio in a stepped manner. The actuator 42 has the shifting device 36 perform a shifting operation. The shifting device 36 is controlled by the second controller 38. The actuator 42 is connected to the second controller 38 so that wired or wireless communication can be performed with each other. The actuator 42 is configured to communicate with the second controller 38 through, for example, power line communication (PLC). The actuator 42 has the shifting device 36 perform a shifting operation in accordance with a control signal from the second controller 38. In one example, the shifting device 36 changes the speed of rotation input to the crankshaft 22A, shown in FIG. 1, and transmits the rotation to the rear wheel 14B. In this case, the shifting device 36 includes an internal shifting device. The internal shifting device is provided near the crankshaft 22A or in a hub of the rear wheel 14B. The internal shifting device can be provided in a power transmission path between the crank 22 and the wheel member 26. In another example, the shifting device 36 changes the speed of rotation input to the crankshaft 22A and transmits the rotation to the rear wheel 14B by moving the chain between front sprockets or rear sprockets. In this case, the shifting device 36 includes an external shifting device (derailleur). The external shifting device includes at least one of a front external shifting device that moves the chain between front sprockets and a rear external shifting device that moves the chain between rear sprockets. The actuator 42 includes an electric motor. The external shifting device can include only the front external shifting device, only the rear external shifting device, or both the front external shifting device and the rear external shifting device. In accordance with driving of the actuator 42, the shifting device 36 performs a shifting operation to change the transmission ratio of the bicycle B in a stepped manner. In a case where the shifting device 36 is an internal shifting device, the shifting operation includes an operation that changes a coupling state of gears included in a planetary gear mechanism provided in the shifting device 36. In a case where the shifting device 36 is an external shifting device, the shifting operation includes an operation that moves the chain between sprockets. The internal shifting device can include a continuously variable transmission (CVT) mechanism. In one example, the CVT mechanism is formed by a planetary mechanism that includes an input body, an output body, and a transmission body. Rotation of the transmission body continuously changes the transmission ratio.

The operating device 44 of the third bicycle component 30C is operable by the user. Thus, the operating device 44 constitutes a user operable input device. The operating device 44 is coupled to the handlebar 20C of the bicycle B. The operating device 44 includes, for example, an operating member, a sensor that detects movement of the operating member, and an electric circuit that communicates with the first controller 34 of the first bicycle component 30A and the second controller 38 of the second bicycle component 30B in accordance with an output signal of the sensor. The sensor detecting movement of the operating member includes a switch. The operating device 44 is connected to the first controller 34 and the second controller 38 so that wired or wireless communication can be performed with each other. The operating device 44 is configured to communicate with the first controller 34 and the second controller 38 through, for example, power line communication. In accordance with operation of the operating device 44 performed by the user, the operating device 44 transmits an output signal to the first controller 34 and the second controller 38.

It is preferred that the operating device 44 include an operating member that changes a control mode of the motor 32. The control mode includes an assist mode that drives the motor 32 in accordance with human driving force. It is preferred that the assist mode include multiple assist modes that differ from each other in strength of assisting power. The control mode can further include at least one of an off mode that does not drive the motor 32 and a walk mode that drives the motor 32 in accordance with operation of the operating device 44. The control mode can further include only the off mode, only the walk mode, or both the off mode and the walk mode. The operating device 44 includes one or more operating members that change the control mode of the motor 32. Each operating member includes a push switch, a lever-type switch, or a touchscreen. The operating device 44 can include an operating member that drives the motor 32 in the walk mode. In a case where a signal for changing the control mode of the motor 32 is received from the operating device 44, the first controller 34 changes the control mode of the motor 32. In each assist mode, the control mode includes a high-speed cruising mode that increases the decrease rate of assisting power with respect to change in speed of the bicycle B in a case where the assisting power is decreased in accordance with the speed of the bicycle B.

It is preferred that the operating device 44 include an operating member that changes the speed stage of the shifting device 36. The operating device 44 includes one or more operating members that change the speed stage of the shifting device 36. Each operating member includes, for example, a push switch, a lever-type switch, or a touchscreen. The operating members that change the control mode of the motor 32 and the operating members that change the speed stage of the shifting device 36 can be provided in separate housings and formed separately from each other. In a case where a signal for changing the speed stage of the shifting device 36 is received from the operating device 44, the second controller 38 controls the actuator 42 to change the speed stage of the shifting device 36.

The operating device 44 can include an operating member that has an external device P perform a predetermined operation. In a case where the operating member is operated to have the external device P perform the predetermined operation, the bicycle communication apparatus 50 transmits a predetermined signal for having the external device P perform the predetermined operation.

The first bicycle component 30A, the second bicycle component 30B, and the third bicycle component 30C are connected by a first electrical cable L1. The first electrical cable L1 includes a power transfer line. The first electrical cable L1 includes a plurality of electric wires. The first bicycle component 30A, the second bicycle component 30B, and the third bicycle component 30C perform PLC communication via the first electrical cable L1. It is preferred that the first bicycle component 30A, the second bicycle component 30B, and the third bicycle component 30C be detachably connected to the first electrical cable L1.

As shown in FIGS. 2 to 6, the bicycle communication apparatus 50 includes a base portion 52 and a wireless communicator 54. The bicycle communication apparatus 50 further includes a wired communicator 56, a first connector 58, one or more second connectors 60, a cover 62, a coupling member 64, an operating portion 66, an indicator 68, an electronic control device 70 and a memory 72.

Figure 3:
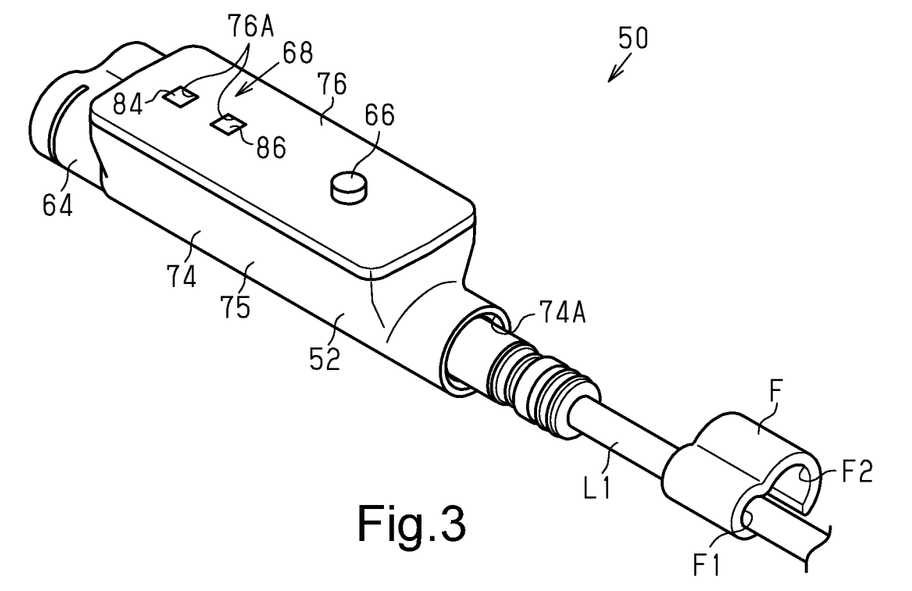
FIG. 3 is a perspective view showing the bicycle communication apparatus of FIGS. 1 and 2 in which the bicycle communication apparatus is connected to a first electrical cable.

The base portion 52, which is shown in FIG. 3, is provided independently from the bicycle components 30. In other words, the base portion 52 is a stand-alone component that is separate from the bicycle components 30. The base portion 52 includes a housing 74. The housing 74 includes a housing body 75 and a lid 76. It is preferred that the housing 74 be generally shaped as a rectangular box. The housing body 75 has an opening. The lid 76 is plate-shaped and covers the opening of the housing body 75. The base portion 52 has an accommodation space 52S (refer to FIG. 4). The accommodation space 52S is defined by the housing body 75 and the lid 76. The accommodation space 52S accommodates the wireless communicator 54, the wired communicator 56, the first connector 58, the second connectors 60, the electronic control device 70 and the memory 72.

Figure 4:
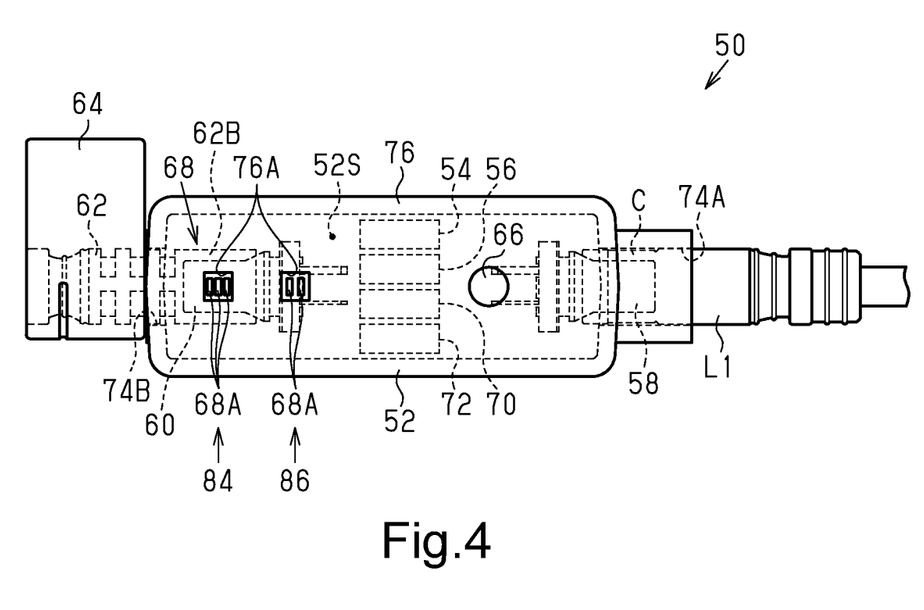
FIG. 4 is a plan view of the bicycle communication apparatus of FIG. 3 connected to the first electrical cable.
Figure 5:
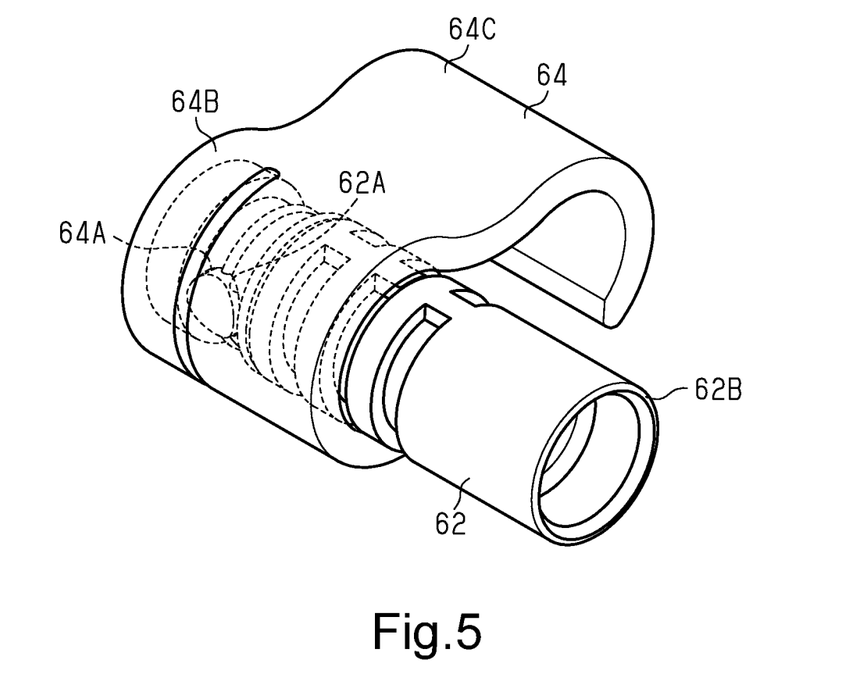
FIG. 5 is a perspective view of a cover and a coupling member for the bicycle communication apparatus shown in FIG. 3.
Figure 6:
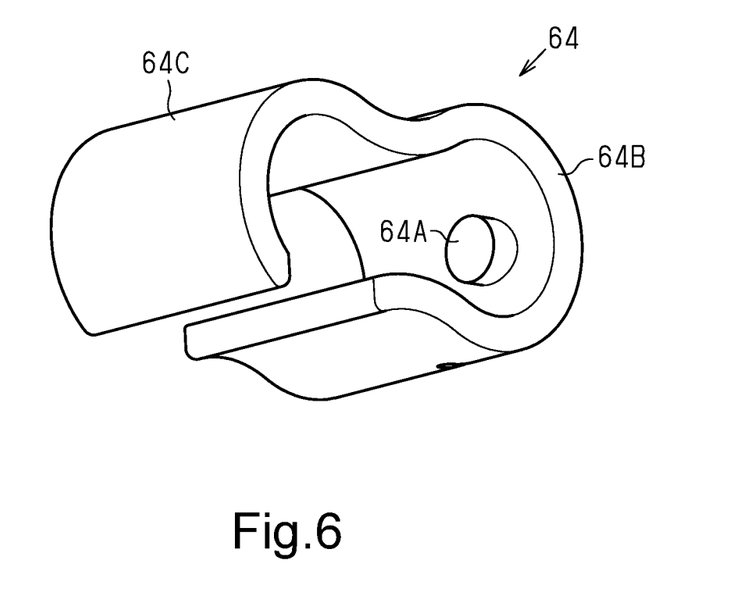
FIG. 6 is a perspective view of the coupling member shown in FIG. 5.

As shown in FIG. 4, the housing 74 includes a first hole 74A and a second hole 74B, which are connected to the accommodation space 52S. The first hole 74A and the second hole 74B are open in different surfaces of the housing 74.

The first connector 58 is connectable to the first electrical cable L1, which connects the bicycle components 30 to the wired communicator 56. More specifically, in a state where an end of the first electrical cable L1 is inserted into the first hole 74A, a connector C provided on the end of the first electrical cable L1 is connected to the first connector 58. The connector C of the first electrical cable L1 includes a plurality of terminals. A coupling member F is provided on the first electrical cable L1 near the connector C and is configured to be coupled to a linear member K (refer to FIG. 1). The coupling member F is formed separately from the first electrical cable L1 and includes a first groove F1 engageable with the first electrical cable L1 and a second groove F2 engageable with the linear member K. It is preferred that the first connector 58 be provided so as not to project out of the housing 74 from the first hole 74A. The first connector 58 is connected via a plurality of terminals to a circuit board on which the electronic control device 70 and the memory 72 are provided. The first connector 58 includes a plurality of terminals connected to the plurality of terminals of the connector C of the first electrical cable L1. The first connector 58 and the connector C can have any shape as long as the terminals can be connected to each other.

The one or more second connectors 60 are electrically connected to the first connector 58 in parallel. The second connectors 60 are connectable to a second electrical cable L2, which connects the bicycle components 30 to the wired communicator 56. The second electrical cable L2 includes a plurality of electric wires. It is preferred that the second connectors 60 be provided so as not to project out of the housing 74 from the second hole 74B. It is preferred that the second connectors 60 and the first connector 58 have the same shape.

The cover 62 is detachably coupled to the second connectors 60. The cover 62 includes a first part 62A. The first part 62A includes one of a recess and a projection. In the example shown in FIG. 5, the first part 62A includes a recess. The cover 62 is generally cylindrical. The first part 62A is provided on one axial end of the cover 62. The other axial end of the cover 62 includes a connector portion 62B configured to be coupled to the second connectors 60. The cover 62 is inserted into the second hole 74B. In a state where the cover 62 is inserted into the second hole 74B, the connector portion 62B is coupled to the second connectors 60. In a state where the cover 62 is inserted into the second hole 74B and the connector portion 62B is coupled to the second connectors 60, the first part 62A is exposed from the base portion 52. The cover 62 is formed from an insulative resin. It is preferred that the cover 62 be formed from an elastic resin.

The coupling member 64 is provided at the cover 62 and configured to be coupled to the linear member K (refer to FIG. 1) installed on the bicycle B. The linear member K includes one or more of an electrical cable, a hydraulic cable or a Bowden cable. The linear member K can include only the electrical cable, only the hydraulic cable, only the Bowden cable, or any combination of the electrical cable, the hydraulic cable and the Bowden cable. The coupling member 64 includes a second part 64A configured to be coupled to the first part 62A of the cover 62 such that the cover 62 and the coupling member 64 can repeatedly detach and reattached. The second part 64A includes the other one of the recess and the projection. In the example shown in FIGS. 5 and 6, the second part 64A includes a projection. The coupling member 64 includes a first coupling portion 64B including the second part 64A and a second coupling portion 64C coupled to the linear member K. The first coupling portion 64B is shaped in conformance with the contour of the cover 62. In a state where the first part 62A is inserted into the second part 64A, the cover 62 engages with the first coupling portion 64B. The first coupling portion 64B and the second coupling portion 64C are located next to each other in a predetermined direction. The second coupling portion 64C is shaped in conformance with the counter of the linear member K. The linear member K engages with the second coupling portion 64C. The first coupling portion 64B is configured to have a generally C-shaped cross section in a direction intersecting with the predetermined direction. The second coupling portion 64C is configured to have a generally C-shaped cross section in a direction intersecting with the predetermined direction. It is preferred that the first coupling portion 64B and the second coupling portion 64C be arranged so that the openings face each other in the cross section intersecting with the predetermined direction. It is preferred that the coupling member 64 be formed from an insulative resin. It is preferred that the coupling member 64 be formed from an elastic resin.

The electronic control device 70 and the memory 72, which are shown in FIGS. 2 and 4, are provided at the base portion 52. The electronic control device 70 is provided in the accommodation space 52S. The electronic control device 70 includes an arithmetic processing unit that executes a predetermined control program. The arithmetic processing unit includes, for example, a CPU or an MPU. The electronic control device 70 can include one or more microcomputers that includes one or more processors and one or more computer storage devices (i.e., computer memory devices). The term "electronic control device" as used herein refers to hardware that executes a software program. The memory 72 stores information used in various control programs and various control processes. The memory 72 is any computer storage device or any computer readable medium with the sole exception of a transitory, propagating signal. The memory 72 includes, for example, a non-volatile memory or a volatile memory. The electronic control device 70 and the memory 72 are provided on a circuit board.

The wireless communicator 54 is provided at the base portion 52. The wireless communicator 54 is provided in the accommodation space 52S. The wireless communicator 54 transmits first information related to the motor 32 and second information related to the shifting device 36 of the bicycle B through wireless communication. In other words, the wireless communicator 54 includes a wireless transmitter that transmits first information related to the motor 32 and second information related to the shifting device 36 of the bicycle B through wireless communication. One example of a standard of wireless communication that the wireless communicator 54 performs is ANT+(registered trademark) or Bluetooth (registered trademark). The first information includes information for showing a control state of the motor 32 on the external device P. The control state of the motor 32 includes the control mode of the motor 32. The second information includes information for showing a control state of the shifting device 36 on the external device P. The control state of the shifting device 36 includes the speed stage of the shifting device 36.

As shown in FIG. 2, the external device P includes an electronic control device P1, a wireless communicator P2, and a display P3. The external device P is, for example, a smartphone, a tablet terminal, or a cycle computer. In a case where the first information and the second information are received from the wireless communicator 54, the wireless communicator P2 of the external device P shows the first information and the second information on the display P3.

Figure 7:
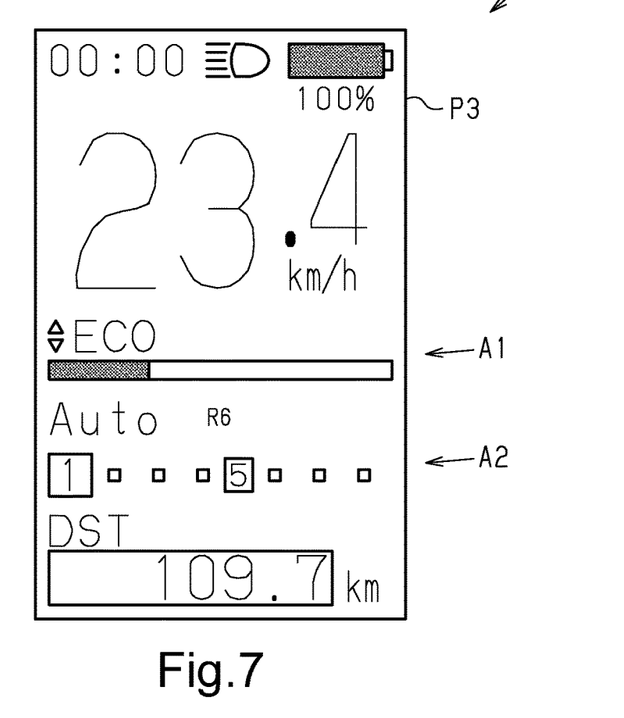
FIG. 7 is an exemplary diagram showing one example of first information and second information shown on a display of an external device.

As shown in FIG. 7, the display P3 of the external device P shows the first information in a first region A1 and the second information in a second region A2. In FIG. 7, the first region A1 shows "ECO," which is a designation of the control mode associated with one of the control modes of the motor 32. The second region A2 shows a numeral corresponding to the present speed stage of the shifting device 36.

Instead of or in addition to the control modes of the motor 32, the first information can include information related to the motor 32 other than the control modes of the motor 32. The information related to the motor 32 other than the control mode of the motor 32 includes, for example, the level of output torque of the motor 32, power of the motor 32, and a distance over which the motor 32 can provide assist.

Instead of or in addition to the speed stages of the shifting device 36, the second information can include information related to the shifting device 36 other than the speed stages of the shifting device 36. The information related to the shifting device 36 other than the speed stages of the shifting device 36 includes, for example, a control mode of the shifting device 36, information for notifying the rider of an optimal shifting timing and/or an optimal speed stage in accordance with preset cadence, information used for the shifting device 36 to automatically change to a predetermined speed stage at a stop, and information related to adjustment of the shifting device 36. The control mode of the shifting device 36 includes, for example, an auto-shifting mode that performs an automatic shifting in which the second controller 38 changes the speed stage in accordance with rotation speed of the crank 22 and a manual mode that changes the speed stage in accordance with operation of the operating device 44.

The wireless communicator 54 of the bicycle communication apparatus 50 can transmit information other than the first information and the second information to the external device P through wireless communication. The information other than the first information and the second information transmitted from the wireless communicator 54 includes, for example, information related to a component, information related to traveling of the bicycle B, information related to operation of the operating device 44, and a predetermined signal for having the external device P perform a predetermined operation. The component includes the bicycle components 30 connected to the bicycle communication apparatus 50. The information related to the component includes, for example, the charge level of the battery 18, a state of a suspension, a state of a height-adjustable seatpost, a state of a light, information of gear combinations of front sprockets and rear sprockets, information related to calibration of a sensor that detects human driving force, maintenance information, and information related to failure. The information related to traveling of the bicycle B includes, for example, a travel speed, a maximum travel speed after travel starts, an average travel speed after travel starts, a travel distance, a total travel distance, travel time, human driving force (human torque, human power), calories burned by the rider, and cadence. The information related to operation of the operating device 44 includes, for example, information for reporting that the operating member has been operated to have the external device P perform a predetermined operation.

The wireless communicator 54 of the bicycle communication apparatus 50 can receive instruction information related to the motor 32 and instruction information related to the shifting device 36 from the external device P. In other words, the wireless communicator 54 includes a wireless receiver that can receive instruction information related to the motor 32 and instruction information related to the shifting device 36 from the external device P. The instruction information related to the motor 32 includes, for example, instruction information for changing the control mode. The instruction information related to the shifting device 36 includes, for example, instruction information for changing between the auto-shifting and the manual shifting. In the illustrated embodiment, since the wireless communicator 54 of the bicycle communication apparatus 50 transmits and receives wireless signals, the wireless communicator 54 can be a transceiver, a transmitter-receiver, or any device(s), separate or combined, capable of transmitting and/or receiving wireless communication signals. However, in one contemplated embodiment, the wireless communicator 54 can be a one-way wireless communication device such as a transmitter that transmits the first information and the second information through wireless communication as previously mentioned.

The wired communicator 56 is provided at the base portion 52. The wired communicator 56 is provided in the accommodation space 52S. The wired communicator 56 is configured to communicate with the bicycle components 30 via a wire. The wired communicator 56 includes a power line communication circuit that performs power line communication. The wired communicator 56 receives the first information and the second information from the bicycle components 30 through the first electrical cable L1. The wired communicator 56 receives the first information from the first controller 34 of the first bicycle component 30A through the first electrical cable L1. The wired communicator 56 receives the second information from the second controller 38 of the second bicycle component 30B through the first electrical cable L1.

The operating portion 66 is provided so that at least part of the operating portion 66 is exposed out of the base portion 52. The operating portion 66 includes, for example, a button, as shown. However, the operating portion 66 is not limited to a button, but can include other inputs such as a lever, a dial, a touch sensor, etc. The operating portion 66 is configured to operate the bicycle components 30. In a case where the operating portion 66 is operated, the wired communicator 56 transmits a control signal for changing the control state of the motor 32. In a case where the control signal for changing the control mode of the motor 32 is received from the operating portion 66, the first controller 34 changes the control mode of the motor 32.

The wireless communicator 54 receives the first information from the first controller 34. The wireless communicator 54 receives the second information from the second controller 38. The wireless communicator 54 receives the first information and the second information from the bicycle components 30 and wirelessly transmits the first information that was received and the second information that was received. More specifically, the electronic control device 70 has the wired communicator 56 that receives the first information and the second information through wired communication, and has the wireless communicator 54 that transmits the first information and the second information through wireless communication.

The indicator 68 is provided at the base portion 52. The indicator 68 is provided at the lid 76. The indicator 68 includes one or more light emitting elements 68A. It is preferred that the light emitting elements 68A each include a light emitting diode (LED). The light emitting elements 68A are located in the accommodation space 52S. The lid 76 is provided with a window 76A at a portion facing each of the light emitting elements 68A to allow light of the light emitting element 68A to transmit to the exterior. The light emitting elements 68A can be mounted on a surface of the lid 76. The indicator 68 is configured to show the at least one of the first information and the second information. The indicator 68 is configured to show only the first information, only the second information, or both the first information and the second information. The indicator 68 includes a first indicator 84 and a second indicator 86. The first indicator 84 is configured to show the first information. In one example, the first indicator 84 includes three light emitting elements 68A. The second indicator 86 is configured to show third information related to the charge level of the battery 18. In one example, the second indicator 86 includes two light emitting elements 68A. Table 1 shows one example of the relationship between presentation contents of the indicator 68 and the first and third information. In the indicator 68 that performs the presentation shown in table 1, the first indicator 84 includes a red LED, a green LED, and a blue LED, and the second indicator 86 includes a red LED and a green LED. In this case, the assist modes include first to third modes differing from each other in assist ratio. The assist ratio of the second mode is greater than the assist ratio of the first mode. The assist ratio of the third mode is greater than the assist ratio of the second mode. A forced economy mode indicates an assist mode that is automatically set by the first controller 34 in a case where the charge level of the battery 18 is less than or equal to a predetermined charge level that is less than 20%. The forced economy mode can be the first mode. For example, in a case where the first bicycle component 30A is powered on, the green LED of the second indicator 86 flashes for a predetermined time. In a case where multiple LEDs flash, it is preferred that the LEDs simultaneously flash. In a case where an error has occurred, the indicator 68 gives priority to showing the error.

TABLE 1

| | 1st Indicator | | | 2nd Indicator | |
| --- | --- | --- | --- | --- | --- |
| | Red LED | Green LED | Blue LED | Red LED | Green LED |
| Off Mode Battery Level > 20% | Off | Off | Off | Off | On |
| Off Mode Battery Level ≤ 20% | Off | Off | Off | On | Off |
| Off Mode Forced ECO Mode | Off | Off | Off | Flashing | Off |
| 1st Mode Battery Level > 20% | Off | Off | On | Off | On |
| 2nd Mode Battery Level > 20% | Off | On | Off | Off | On |
| 3rd Mode Battery Level > 20% | On | Off | Off | Off | On |
| 1st Mode Battery Level ≤ 20% | Off | Off | On | On | Off |
| 2nd Mode Battery Level ≤ 20% | Off | On | Off | On | Off |
| 3rd Mode Battery Level ≤ 20% | On | Off | Off | On | Off |
| 1st Mode Forced ECO Mode | Off | Off | On | Flashing | Off |
| 2nd Mode Forced ECO Mode | Off | On | Off | Flashing | Off |
| 3rd Mode Forced ECO Mode | On | Off | Off | Flashing | Off |
| Walk Mode Battery Level > 20% | Off | Flashing | Off | Off | On |
| Walk Mode Battery Level ≤ 20% | Off | Flashing | Off | On | Off |
| Walk Mode Forced ECO Mode | Off | Flashing | Off | Flashing | Off |
| Error | Flashing | Off | Off | Flashing | Off |
| Others | Off | Off | Off | Off | Off |

In a case where the indicator 68 shows the second information, it is preferred that the indicator 68 include a plurality of light emitting elements 68A, for example, configured to produce colors corresponding to the total number of speed stages of the shifting device 36. Alternatively, it is preferred that the indicator 68 include a segment LED showing the speed stage of the shifting device 36 with a letter or a numeral.

With the bicycle communication apparatus 50, the first information and the second information are transmitted from the single wireless communicator 54 through wireless communication. Thus, complication of information exchange is limited as compared to, for example, a case where the first bicycle component 30A and the second bicycle component 30B are each provided with a wireless communicator, the first bicycle component 30A transmits the first information through wireless communication, and the second bicycle component 30B transmits the second information through wireless communication. Additionally, for example, in a case where the external device P is attached to the handlebar 20C, the bicycle communication apparatus 50 is located closer to the external device P than the first bicycle component 30A and the second bicycle component 30B. Thus, wireless communication is performed in a preferred manner.

Modifications

The description related to the above embodiment exemplifies, without any intention to limit, an applicable form of a bicycle communication apparatus according to the present disclosure. The bicycle communication apparatus according to the present disclosure is applicable to, for example, modifications of the above embodiment that are described below and combinations of two or more of the modifications that do not contradict each other. In the following modifications, the same reference characters are given to those elements that are the same as the corresponding elements of the embodiment. Such elements will not be described in detail.

Figure 8:
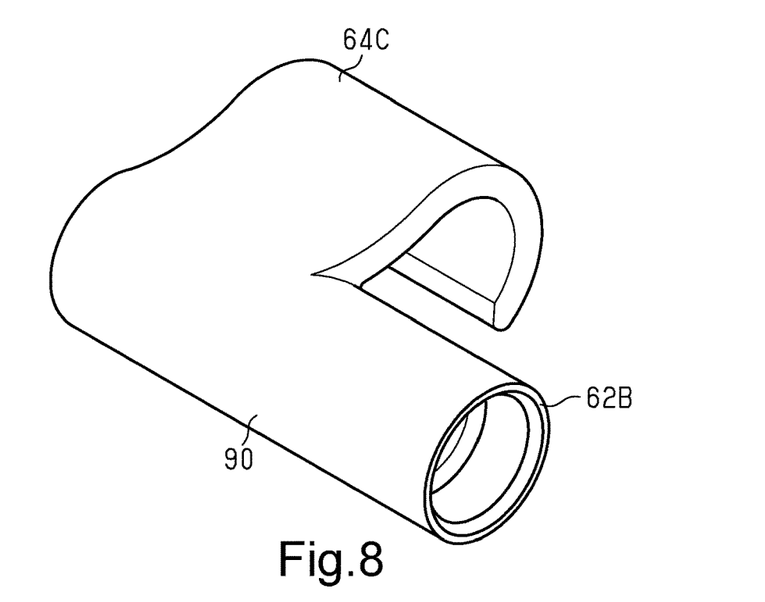
FIG. 8 is a perspective view of a first modification of a cover and a coupling member for the bicycle communication apparatus shown in FIG. 3.

The cover 62 and the coupling member 64 can be formed integrally with each other. For example, FIG. 8 shows a cover 90 in which the cover 62 is formed integrally with the second coupling portion 64C of the coupling member 64.

Figure 9:
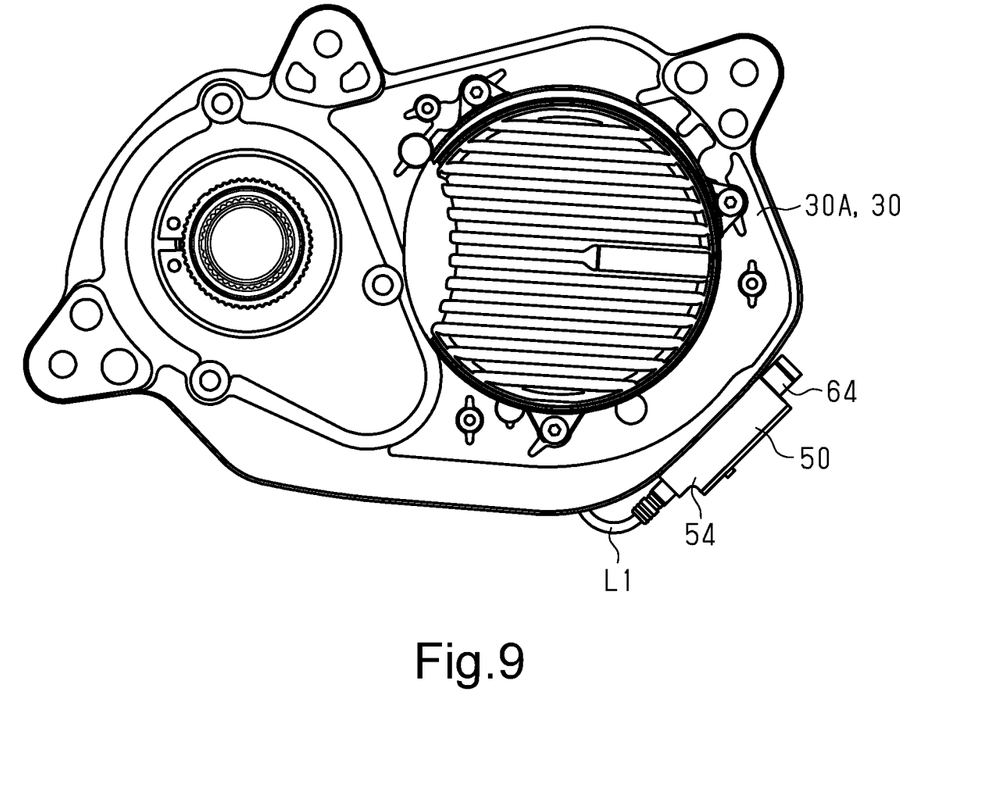
FIG. 9 is a side elevational view of a bicycle component provided with the bicycle communication apparatus installed on the bicycle component.

The base portion 52 can be provided at one of the bicycle components 30. For example, FIG. 9 shows the base portion 52 that is provided on the first bicycle component 30A. The base portion 52 can be provided at the second bicycle component 30B or the third bicycle component 30C. The base portion 52 can be provided on an outer surface of one of the bicycle components 30 or in the housing of the bicycle component 30 or can be formed integrally with the housing of the bicycle component 30.

Figure 10:
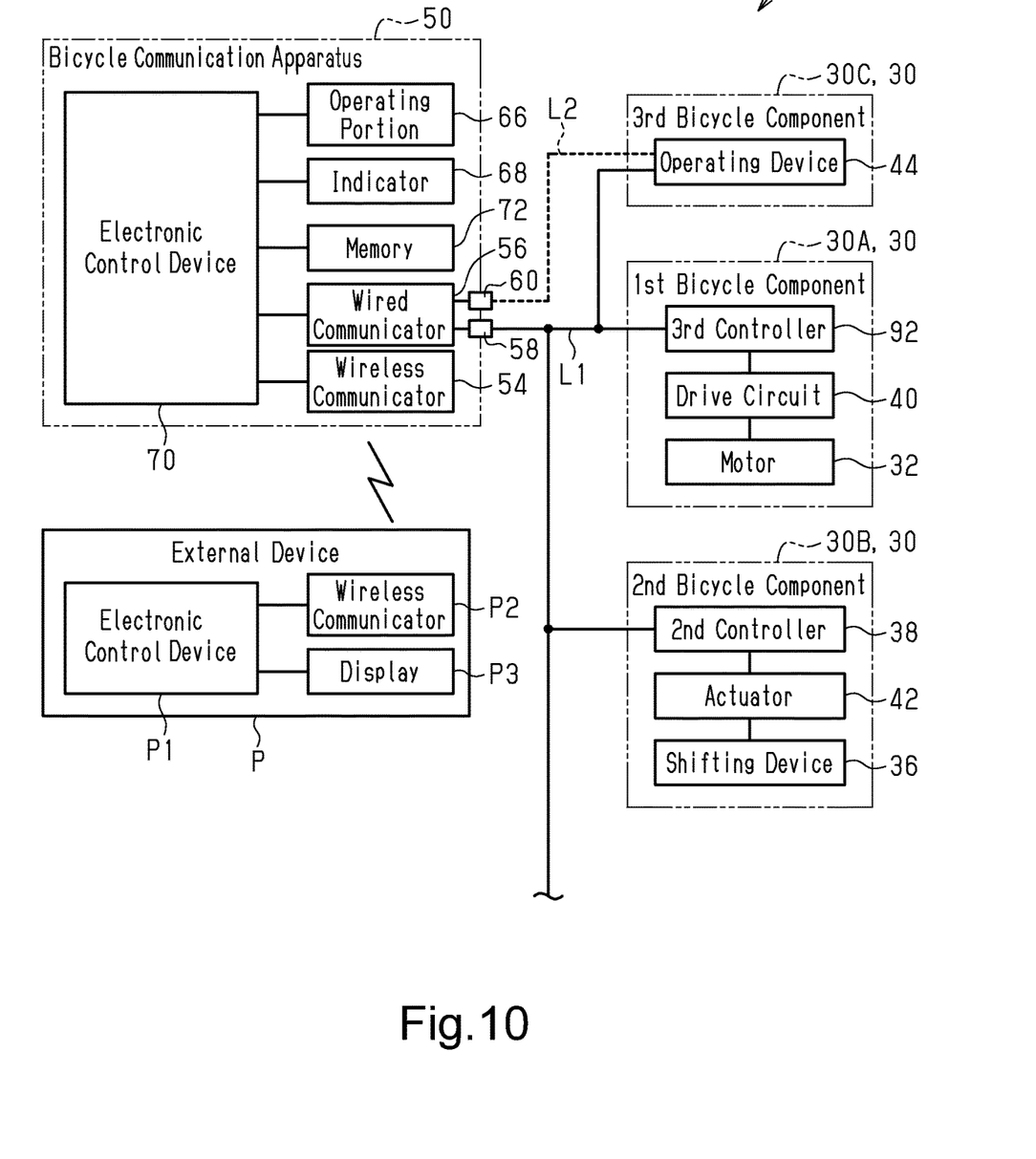
FIG. 10 is a block diagram showing a modified bicycle electrical system for the bicycle shown in FIG. 1 that include the bicycle communication apparatus.

As shown in FIG. 10, the bicycle components 30 can include a third controller 92 that controls the motor 32 and the shifting device 36. The third controller 92 is provided, for example, in the first bicycle component 30A. The wireless communicator 54 of the bicycle communication apparatus 50 receives the first information and the second information from the third controller 92. In this modification, the second controller 38 can be omitted from the second bicycle component 30B.

In the modification shown in FIG. 10, the second controller 38 can be changed to the third controller 92. In this case, the first controller 34 can be omitted from the first bicycle component 30A.

In the modification shown in FIG. 10, the third controller 92 can be provided in a bicycle component 30 that differs from the first bicycle component 30A and the second bicycle component 30B. In this case, at least one of the first controller 34 and the second controller 38 can be omitted.

Only the first controller 34, only the second controller 38, or both first controller 34 and the second controller 38 can be omitted.

The wireless communicator 54 can receive the at least one of the first information and the second information from the operating device 44. The wireless communicator 54 can receive only the first information, only the second information, or both the first information and the second information. For example, as indicated by the broken lines in FIGS. 2 and 10, the second connector 60 can be connected to the operating device 44 by the second electrical cable L2. In this case, the cover 62 is removed from the second connector 60, and the second connector 60 is connected to a connector provided on an end of the second electrical cable L2, which is connected to the operating device 44. In a case where the operating member of the operating device 44 is operated, the wired communicator 56 receives at least one of a signal for changing the control mode of the motor 32 and a signal for changing the speed stage of the shifting device 36 via the first connector 58 or the second connector 60. The signal from the operating device 44 includes at least one of the first information and the second information. The electronic control device 70 has the wireless communicator 54 transmit the first information and the second information, which are received from the operating device 44 via the wired communicator 56, through wireless communication.

As indicated by the broken line in FIG. 2, in a modification in which connection is made via the first connector 58 or the second connectors 60, a portion of the first electrical cable L1 that connects the third bicycle component 30C to the first bicycle component 30A and the second bicycle component 30B can be omitted. In this case, the bicycle communication apparatus 50 transmits a signal received from the operating device 44 to the first bicycle component 30A and the second bicycle component 30B via the wired communicator 56.

What is claimed is:

1. A bicycle communication apparatus comprising:
   a base portion configured to be coupled to one of a side wall of an intermediate portion of a linear member and a housing of a bicycle component, the linear member including at least one of an electrical cable, a hydraulic cable and a Bowden cable of a bicycle, the bicycle component including at least one of a motor, a shifting device and an operating device that operates one or more of the motor and the shifting device, the base portion including a first face side and a second face side, the first and second face sides facing in opposite directions with respect to each other, the base portion having a hole disposed at an end of the base portion;
   a first connector coupled to the base portion on the first face side of the base portion and connectable to a first electrical cable that connects the bicycle component to a wired communicator;
   at least one second connector electrically coupled to the second face side of the base and connectable to a second electrical cable;
   a coupling member configured to be coupled to the linear member installed on the bicycle, the coupling member having a first groove aligned with the hole of the base portion, the coupling member further having a second groove engageable with the linear member; and
   a wireless communicator provided at the base portion to be electrically connected to at least one of the first and second connectors, the wireless communicator is configured to transmit first information related to the motor that assists in propulsion of the bicycle and second information related to the shifting device of the bicycle through wireless communication, the first information relating to an assist mode of the motor, the assist mode including at least one of an OFF mode and a walk mode.

2. The bicycle communication apparatus according to claim 1, wherein
   the first information of the wireless communicator includes information for indicating a control state of the motor on an external device.

3. The bicycle communication apparatus according to claim 1, wherein
   the second information of the wireless communicator includes information for indicating a control state of the shifting device on an external device.

4. The bicycle communication apparatus according to claim 1, wherein
   the base portion has an accommodation space, and
   the wireless communicator is provided in the accommodation space.

5. The bicycle communication apparatus according to claim 1, wherein
   the wireless communicator is configured to receive the first information and the second information from the bicycle component, and is configured to transmit the first information that was received and the second information that was received.

6. The bicycle communication apparatus according to claim 5, wherein
   the base portion is provided independently from the bicycle component.

7. The bicycle communication apparatus according to claim 5, wherein
   the base portion is provided at the bicycle component.

8. The bicycle communication apparatus according to claim 5, wherein
   the wireless communicator is configured to receive the first information from a first controller of the bicycle component in which the first controller controls the motor.

9. The bicycle communication apparatus according to claim 5, wherein
   the wireless communicator is configured to receive the second information from a second controller of the bicycle component in which the second controller controls the shifting device.

10. The bicycle communication apparatus according to claim 5, wherein
    the wireless communicator is configured to receive the first information and the second information from a third controller of the bicycle component in which the third controller controls the motor and the shifting device.

11. The bicycle communication apparatus according to claim 5, wherein
    the bicycle component includes a first bicycle component including the motor and a second bicycle component including the shifting device.

12. The bicycle communication apparatus according to claim 5, wherein
    the bicycle component includes the operating device that operates either the motor or the shifting device, or both the motor and the shifting device, and the wireless communicator is configured to receive the first information or the second information from the operating device, or both the first information and the second information from the operating device.

13. The bicycle communication apparatus according to claim 5, further comprising
the wired communicator configured to communicate with the bicycle component via a wire.

14. The bicycle communication apparatus according to claim 13, wherein
the wired communicator includes a power line communication circuit.

15. The bicycle communication apparatus according to claim 13, further comprising:
a cover detachably coupled to the at least one second connector, the coupling member is provided at the cover.

16. The bicycle communication apparatus according to claim 15, wherein
the cover includes a first part, and
the coupling member includes a second part coupled to the first part.

17. The bicycle communication apparatus according to claim 15, wherein
the cover is formed integrally with the coupling member.

18. The bicycle communication apparatus according to claim 13, further comprising
an operating portion operatively coupled to the wired communicator that transmits a control signal to change a control state of the motor in response to the operating portion being operated.

19. The bicycle communication apparatus according to claim 1, further comprising
an indicator provided at the base portion and configured to indicate either the first information or the second information, or both of the first information and the second information.

20. The bicycle communication apparatus according to claim 19, wherein
the indicator includes one or more light emitting elements.

* * * * *